(12) United States Patent
Rosen et al.

(10) Patent No.: US 12,344,750 B2
(45) Date of Patent: Jul. 1, 2025

(54) HIGH BIO-RENEWABLE CONTENT INKS AND RESINS

(71) Applicant: SUN CHEMICAL CORPORATION, Parsippany, NJ (US)

(72) Inventors: Josie M. Rosen, Carlstadt, NJ (US); Guy VanOudenhoven, Menasha, WI (US); Ralph Arcurio, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 125 days.

(21) Appl. No.: 17/919,926

(22) PCT Filed: May 14, 2021

(86) PCT No.: PCT/US2021/032393
§ 371 (c)(1),
(2) Date: Oct. 19, 2022

(87) PCT Pub. No.: WO2021/231829
PCT Pub. Date: Nov. 18, 2021

(65) Prior Publication Data
US 2023/0183500 A1    Jun. 15, 2023

Related U.S. Application Data

(60) Provisional application No. 63/025,314, filed on May 15, 2020.

(51) Int. Cl.
| | | |
|---|---|---|
| *C09D 11/08* | (2006.01) | |
| *B41M 7/00* | (2006.01) | |
| *C08H 99/00* | (2010.01) | |
| *C09D 11/033* | (2014.01) | |
| *C09D 11/037* | (2014.01) | |

(52) U.S. Cl.
CPC ............... *C09D 11/08* (2013.01); *B41M 7/00* (2013.01); *C08H 99/00* (2013.01); *C09D 11/033* (2013.01); *C09D 11/037* (2013.01)

(58) Field of Classification Search
CPC .................................................. C09D 193/04
See application file for complete search history.

(56) References Cited

U.S. PATENT DOCUMENTS

| | | | | | |
|---|---|---|---|---|---|
| 2,063,869 | A | * | 12/1936 | Ellis | C09D 191/005 106/222 |
| 2,440,242 | A | * | 4/1948 | Auer | C09F 1/00 530/218 |
| 4,792,356 | A | * | 12/1988 | Rudolphy | C09F 1/04 106/31.75 |
| 5,698,668 | A | * | 12/1997 | Bender | C09B 67/006 530/215 |
| 5,814,701 | A | | 9/1998 | Catena | |
| 5,830,992 | A | * | 11/1998 | Whalen | C09F 1/04 530/211 |
| 6,432,195 | B1 | * | 8/2002 | Rathschlag | C09D 11/037 106/500 |
| 8,431,303 | B2 | * | 4/2013 | Sacripante | G03G 9/0806 527/600 |
| 2005/0143488 | A1 | * | 6/2005 | Dandreaux | C09D 11/08 524/270 |
| 2007/0179277 | A1 | * | 8/2007 | Dallavia | C09D 11/08 530/210 |
| 2011/0034669 | A1 | * | 2/2011 | Dallavia | C08L 93/04 530/216 |
| 2014/0368588 | A1 | | 12/2014 | Keoshkerian | |
| 2022/0267626 | A1 | * | 8/2022 | Okawachi | C09D 11/037 |
| 2023/0340284 | A1 | * | 10/2023 | VanOudenhoven | C09D 11/38 |

FOREIGN PATENT DOCUMENTS

EP        1 578 854 A1      9/2005

OTHER PUBLICATIONS

Parmar et al. (BioChemistry and Biophysics Reports 13, (2018) 22-26) (Year: 2018).*
International Search Report issued in International Application No. PCT/US2021/032393, mailed Sep. 1, 2021.
Written Opinion of the International Searching Authority issued in International Application No. PCT/US2021/032393, mailed Sep. 1, 2021.
International Preliminary Report on Patentability (Chapter 1 of the Patent Cooperation Treaty) issued in International Application No. PCT/US2021/032393, mailed Apr. 4, 2022.
Anonymous: "Inks," Aug. 14, 2021, pp. 1-9, XP055832682, Retrieved from the Internet: URL:https://en.wikipedia.org/wiki/Ink, (retrieved on Aug. 18, 2021).
Anonymous: "Resin acid", May 26, 2018, pp. 1-3, XP055833132, Retrieved from the Internet: URL:https://en.wikipedia.org/wiki/Resin_acid [retrieved on Aug. 19, 2021].
Pyne Lydia: "A History of Ink in Six Objects", May 16, 2018, pp. 1-12, XP055832683, Retrieved from the Internet: URL:https://www.historytoday.com/history-matters/history-ink-six-objects [retrieved on Aug. 18, 2021] the whole document.

(Continued)

*Primary Examiner* — Liam J Heincer
(74) *Attorney, Agent, or Firm* — Marian E. Fundytus; Amster Rothstein & Ebenstein LLP

(57) ABSTRACT

The present invention provides novel anionic modified rosin ester resins having a high BRC content, up to 100% BRC. The resins of the present invention are useful as emulsion, dispersion, or solution resins. High BRC content pigment grind vehicles, coatings, and finished inks can be prepared using the resins of the present invention. Advantageously, the finished inks of the present invention have equal to or superior properties compared to current commercially available inks sold as sustainable products, but having little to no BRC content. The present invention represents a significant step towards developing sustainable inks and coatings that are better for the environment.

21 Claims, No Drawings

(56) References Cited

OTHER PUBLICATIONS

Lopez-Montes A et al: "Characterization of sepia ink in ancient graphic documents by capillary electrophoresis", Microchemical Journal, New York, NY, US, vol. 93, No. 2, Nov. 1, 2009, pp. 121-126, XP026704756, ISSN: 0026-265X, DOI: 10.1016/J.MICROC. 2009.05.008 [retrieved on May 30, 2009] the whole document.

Anonymous: "Rosin—Wikipedia, the free encyclopedia", Jan. 15, 2019, pp. 1-7, XP055825065, Retrieved from the Internet: URL:https://en.wikipedia.org/w/index.php?title=Rosin&oldid-878481535 [retrieved on Jul. 16, 2021] the whole document.

Goren Ahmet C. et al: "Chemical Composition of Natural Colophony from Pinus Brutia and Comparison with Synthetic Colophony", Natural Product Communications, vol. 5, No. 11, Nov. 1, 2010, XP055833121, US ISSN: 1934-578X, DOI: 10.1177/1934578X1000501105 Retrieved from the Internet: URL:https://journals.sagepub.com/doi/pdf/1 0.1177/1934578X1000501105> the whole document.

Szymon Kugler et al: "Advances in Rosin-Based Chemicals: the Latest Recipes, Applications and Future Trends", Molecules, vol. 24, No. 9, Apr. 26, 2019 (Apr. 26, 2019), pp. 1-52, XP055741692, DOI: 10.3390/molecules24091651 the whole document.

Anonymous: "REACH registrations of Rosin, Rosin Salts and Rosin Esters, H4R Position Statement on One Substance Registration", H4R Position Statement on Rosin, Rosin Salts and Rosin Esters Registered as One Substance, Feb. 7, 2019, pp. 1-54, XP055832510, Retrieved from the Internet: URL:https://h4rconsortium.com/attachments/H4R vzw Position on Rosin as one substance under REACH FebTltaTy_201g.pUf-T [retrieved on Aug. 17, 2021] the whole document.

Anonymous: "Flexiverse Water Based Dispersions", Sun Chemical Performance Pigments, Jan. 1, 2013, pp. 1-12, XP055832907, Retrieved from the Internet: URL:https://www.brenntag.com/media/documents/bsi/product-data-sheets/material-scienc e/sun-chemical/flexiverse_dispersions.pdf [retrieved on Aug. 18, 2021] the whole document.

"ASTM D6866-08 Standard Test Methods for Determining the Biobased Content of Solid, Liquid, and Gaseous Samples Using Radiocarbon Analysis", ASTM International Standard, ASTM International, US vol. ASTM D6866-08 Feb. 3, 2010, pp. 698-712, XP008172700, Retrieved from the Internet: URL:http://www.astm.org/DATABASE.CART/HISTORICAL/D6866-08.htm the whole document.

Anonymous: "Resin acids and Rosin acids, reaction products with citric acid, ammonium salts CAS#: 92129-49-2", Jan. 1, 2017, pp. 1-1, XP055833574, Retrieved from the Internet: URL:https://www.chemicalbook.com/ProductChemicalPropertiesCB8916714 EN.htm [retrieved on Aug. 20, 2021] the whole document.

\* cited by examiner

HIGH BIO-RENEWABLE CONTENT INKS AND RESINS

CROSS REFERENCE TO RELATED APPLICATIONS

The present application is a § 371 National Phase application based on PCT/US2021/032393 filed May 14, 2021, which claims the benefit of U.S. Provisional Application No. 63/025,314, filed May 15, 2020 the subject matter of each of which is incorporated by reference in their entirety.

FIELD OF THE INVENTION

The present invention is related to resins containing high bio-renewable content (BRC) materials, as well as compositions, for example, pigment grind vehicles, varnishes/technical varnishes, ink and coating vehicles, and inks, prepared using the resins. Preferably the compositions are water-based. The resins and compositions prepared therefrom have very high BRC content (up to 100%), and are therefore sustainable products that are better for, and enhance the quality of, the environment, and contribute to conservation of energy resources by replacing old carbon materials prepared from fossil fuel products.

BACKGROUND OF THE INVENTION

For several years, the printing ink industry has been attempting to construct products using a maximum quantity of renewable and responsibly sourced carbon. There are two general forms of carbon materials in printing inks. The first form of carbon materials represent high BRC (bio-renewable content) materials, i.e. those with carbon originating from recently living sources (naturally derived materials). The second type are raw materials originating from ancient carbon (e.g. petroleum, coal), which are considered low or zero BRC. The responsible ink formulation trend is to replace low BRC materials with higher BRC materials to diminish the environmental and climatic impact of the final degradation product—carbon dioxide.

Naturally derived materials are those that are derived from plants, minerals, animals, microorganisms, or their reaction products. The amount of naturally derived materials in inks has been restricted because of failure to attain good adhesion, moisture resistance, chemical resistance, rub resistance, and other desirable properties, if the amount of naturally derived materials is too high. In addition, even when naturally derived materials are used in inks, it is generally necessary to include non-natural and environmentally harmful materials, such as petroleum distillates, to achieve the necessary properties. This is particularly an issue when the inks are intended for use on materials used for applications where the product is exposed to moisture, chemicals, or rubbing.

A major preferred characteristic of water-based resins and polymers is that they are anionic in character. The specific assignment of acid number is essential to the property of water resistance in a dry (printed) ink, and equally essential to water solubility (print quality) in the wet ink at a preferred pH of equal to or greater than 8.5, more preferably equal to or greater than 9.0. Ink resin properties of scuff resistance and oil resistance are known by those skilled in the art as having their origin in the intrinsic properties of the intermediates that comprise the final constructed polymer. Segments of a resin polymer having high intrinsic polarity will typically elevate the oil resistance, and reduce oil solubility in the final resin. Ink resins containing (intermediate) segments of high hydrocarbon character will typically produce elevated scuff resistance versus similar polymers with less hydrocarbon construct.

U.S. Pat. No. 2,440,242 discloses a process for preparing a condensation rosin product. The process incorporates 0.1 wt % to 30 wt %, preferably 2 wt % to 15 wt %, of an organic acid into the rosin. The organic acids are selected from the group consisting of oxalic acid, citric acid, salicylic acid, tartaric acid and benzoic acid.

Citation or identification of any document in this application is not an admission that such represents prior art to the present invention.

The present invention addresses the need in the art of ink and coating formulations, especially water-based, to provide inks and coatings with high BRC which also have acceptable performance characteristics.

SUMMARY OF THE INVENTION

The present invention provides anionic modified rosin ester resins that are thermal adduction reaction products of colophony, or a derivative thereof, and organic acids of natural origin that have a hydroxyl group. The resins have high BRC content, up to about 100% BRC. The present invention also provides water-based compositions, such as pigment grind vehicles, technical varnishes, ink vehicles, and finished inks, comprising the high BRC anionic modified rosin esters of the present invention.

In a particular aspect, the present invention provides an anionic modified rosin ester, which is the reaction product of:
  (a) 1 wt % to 99 wt % of a rosin monomer or dimer, based on the total weight of reactants; and
  (b) 1 wt % to 99 wt % of one or more organic acids having one or more hydroxyl groups, based on the total weight of the reactants;
wherein:
  i. the modified rosin ester has a bio-renewable carbon (BRC) content of 95% to 100%;
  ii. the modified rosin ester has an acid value of 100 mg KOH/g to 400 mg KOH/g.

In another aspect, the present invention provides a process for preparing the anionic modified rosin ester, comprising reacting:
  (a) 1 wt % to 99 wt % of a rosin, based on the total weight of the reactants; and
  (b) 1 wt % to 99 wt % one or more organic acids having one or more hydroxyl groups, based on the total weight of the reactants;
  in a thermal adduction reaction, performed at a temperature of 150° C. to 225° C.; to obtain an anionic modified rosin ester;
wherein:
  i. the hydroxyl group of the organic acid reacts as an alcohol to increase the acid value of the rosin;
  ii. the modified rosin ester has a bio-renewable carbon (BRC) content of 95 wt % to 100%;
  iii. the modified rosin ester has an acid value of 100 mg KOH/g to 400 mg KOH/g.

In certain embodiments, the modified rosin ester of the present invention is the reaction product of 1 wt % to 70 wt % of a rosin monomer or dimer, based on the total weight of the reactants; and 30 wt % to 99 wt % of one or more organic acids having one or more hydroxyl groups, based on the total weight of the reactants.

In certain embodiments, the process for preparing the modified anionic rosin resin is performed under nitrogen. In other embodiments the process for preparing the modified anionic rosin resin is performed under vacuum.

In one embodiment, the resins of the present invention are suitable for use as dispersion, emulsion, or solution resins.

In another aspect, the present invention provides water-based compositions comprising the anionic modified rosin esters. In some embodiments, the water-based composition is a varnish, pigment grinding vehicle, pigment dispersion, ink or coating vehicle, coating, or finished ink.

These and other objects, advantages, and features of the invention will become apparent to those persons skilled in the art upon reading the details of the formulations and methods as more fully described below.

DETAILED DESCRIPTION OF THE INVENTION

The present application is directed to anionic modified rosin ester resins that can be used as dispersion, emulsion, or solution resins in water-based compositions such as a varnish, pigment grinding vehicle, pigment dispersion, ink or coating vehicle, coating, or finished ink. The resins and other compositions of the invention have a high BRC content. In certain embodiments, the compositions of the invention have 100% BRC content.

Currently available water-based inks typically comprise styrene-based resins. While styrene-based resins are attractive due to their inherent mechanical properties, processability, and low cost, because styrene is a suspected carcinogen and neurotoxin, it has been under increased scrutiny and regulatory pressure. This is true both in the initial production of styrene-resin based products, such as inks and coatings, as well as in end-of-life recycling and/or composting processes, where environmental exposure to styrene monomers represents a potential contamination source and risk. Styrene-free alternatives, which deliver equivalent performance without increases in cost, and with clean environmental, safety, and health profiles are desired. Preferably, the water-based compositions of the present invention are free of styrene. The anionic modified rosin ester resins of the present invention are designed to replace the styrene and styrene/acrylic resins used in conventional inks.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

As used herein, "natural material(s)" are materials that are botanic (plant-based), mineral-based, of animal original, derived from microorganisms, their reaction products, and combinations thereof, and water. Natural materials may be used as they occur in nature, or they can undergo processing that does not significantly alter the original physical, chemical, or biological state of the ingredient. Examples of permissible processing include dehydration, extraction, extrusion, centrifugation, filtration, distillation, grinding, sieving, compression, freezing, drying, milling, etc. Natural materials include, but are not limited to, water, natural resins, natural defoamers, natural waxes, natural colorants, bio-solvents, natural minerals, and the like.

As used herein, "BRC" refers to bio-renewable content or bio-renewable carbon, which can further be defined as non-ancient carbon (i.e. non-fossil-based carbon) that is part of earth's natural environment. Non-ancient carbon (less than 40,000 years after final atmospheric carbon incorporation) contains radiocarbon ($^{14}C$), whereas ancient (fossil-based) carbon does not contain radiocarbon. BRC refers to naturally occurring renewable resources that can be replenished to replace the portion depleted by usage and consumption, either through natural reproduction, or other recurring processes in a finite amount of time (such as within a human lifetime).

As used herein, "plant-based" refers to materials that contain equal to or greater than 50% of the ingredient mass from plant-based sources.

As used herein, "naturally derived" refers to materials with equal to or greater than 50% natural or biobased origin by molecular weight, based on renewable carbon content.

As used herein, "natural minerals" refers to inorganic materials occurring naturally in the earth, having a distinctive chemical formula and consistent set of physical properties (e.g. crystalline structure, hardness, colors, etc.). Also included are "derived minerals"—materials obtained through chemical processing of inorganic substances occurring naturally in the earth, which have the same chemical composition as natural mineral ingredients (e.g. calcium carbonate, silica, hydrated silica, sodium fluoride, titanium dioxide).

As used herein, "bio-based" refers to materials containing carbon of renewable origin from agricultural, plant, animal, fungi, microorganisms, marine, or forestry materials.

As used herein, "renewable" refers to materials that are part of earth's natural environment. Renewable resources are naturally occurring, and can be replenished to replace the portion depleted by usage and consumption, either through natural reproduction or other recurring processes, in a finite amount of time (such as within a human lifetime).

As used herein, "sustainable" refers to the quality of not being harmful to the environment or depleting natural resources, and thereby supporting long-term ecological balance.

As used herein, "colophony" refers to rosins/resins that come from the sap of coniferous trees, such as pines, junipers, firs, and cedars. Colophony comprises high molecular weight unsaturated acids.

As used herein, the term "alkyl" refers to straight chain and branched chain saturated non-cyclic hydrocarbons, having from 1 to 20 carbon atoms, preferably 1 to 10 carbon atoms. Representative straight chain alkyl groups include methyl, -ethyl, -n-propyl, -n-butyl, -n-pentyl, -n-hexyl, n-heptyl, n-octyl, n-nonyl, n-decyl, and n-amyl. Representative branched alkyl groups include isopropyl, sec-butyl, isobutyl, tert-butyl, isopentyl, neopentyl, 1-methylbutyl, 2-methylbutyl, 3-methylbutyl, 1,1-dimethylpropyl, 1,2-dimethylpropyl, 1-methylpentyl, 2-methylpentyl, 3-methylpentyl, 4-methylpentyl, 1-ethylbutyl, 2-ethylbutyl, 3-ethylbutyl, 1,1-dimethylbutyl, 1,2-dimethylbutyl, 1,3-dimethylbutyl, 2,2-dimethylbutyl, 2,3-dimethylbutyl, 3,3-dimethylbutyl, 5-methylhexyl, 6-methylheptyl, 2-ethylhexyl, and the like.

As used herein, "carbonyl" or "carbonyl group" refers to a functional group composed of a carbon atom double bonded to an oxygen atom. When a cycloalkyl or heterocycle is substituted with a carbonyl group this means that one of the carbon atoms of the ring is double bonded to an oxygen atom.

As used herein, the term "cycloalkyl" as used by itself or as part of another group refers to saturated and partially unsaturated (e.g. containing one or two double bonds) cyclic aliphatic hydrocarbons containing one to three rings having from three to twelve carbon atoms (i.e., $C_3$-$C_{12}$ cycloalkyl) or the number of carbons designated. In one embodiment, the cycloalkyl group has two rings. Non-limiting exemplary cycloalkyl groups include cyclopropyl, cyclobutyl, cyclopentyl, cyclohexyl, cycloheptyl, cyclooctyl, norbornyl, decalin, adamantyl, cyclohexenyl, and the like.

As used herein, the term "heterocycle" or "heterocyclo" refers to a 3- to 12-membered monocyclic heterocyclic ring which is either unsaturated or partially saturated. A 3-membered heterocycle can contain up to 1 heteroatom; a 4-membered heterocycle can contain up to 2 heteroatoms; a 5-membered heterocycle can contain up to 4 heteroatoms; a 6-membered heterocycle can contain up to 4 heteroatoms; and a 7-membered heterocycle can contain up to 5 heteroatoms. Each heteroatom is independently selected from nitrogen (which can be quaternized), oxygen, and sulfur (including sulfoxide and sulfone). The heterocycle can be attached via a nitrogen or carbon atom. Representative heterocycles include thiazolidinyl, morpholinyl, pyrrolidinonyl, pyrrolidinyl, piperidinyl, piperazinyl, 2,3-dihydrofuranyl, dihydropyranyl, hydantoinyl, valerolactamyl, oxiranyl, oxetanyl, tetrahydrofuranyl, tetrahydropyranyl, dihydropyridinyl, tetrahydropyridinyl, tetrahydropyrimidinyl, tetrahydrothiopyranyl, and the like.

As used herein, the term "amine" refers to an ammonia derivative wherein one, two or three hydrogen atoms have been replaced by an organic (carbon containing) substituent.

As used herein, "higher amine" refers to an amine having a molecular weight of equal to or greater than 32 Daltons.

As used herein, the phrase "optionally substituted" refers to a group that is either unsubstituted or substituted.

As used herein, a "composition of the invention" or "composition" refers generally to a pigment grind vehicle, pigment dispersion, varnish/technical varnish, coating, ink vehicle, or finished ink of the invention, unless a specific type of composition is referred to.

Anionic Modified Rosin Ester Resins and Compositions Using Same

The anionic modified rosin ester resins of the present invention are prepared via a thermal adduction technique. Anionic (dimer, oligomer, and polymer) construction via thermal adduction utilizes a technique of covalent bonding two or more reactive segments using elevated temperatures under nitrogen atmosphere. The reaction temperature is preferably equal to or greater than 150° C., more preferably equal to or greater than 175° C., and most preferably equal to or greater than 200° C. Each of the segments preferably contributes physical properties and bio-renewable content. The thermal adduction products of the present invention are unique in that they are comprised of up to 100% BRC, and exhibit exceptional physical properties. These inventive resins provide excellent scuff resistance, water resistance, oil resistance and BRC within a water-based vehicle, or as a pigment grinding vehicle for color dispersions.

The present invention provides anionic modified solution resins, prepared from rosins, such as gum rosins, which are of up to 100% BRC, to produce 100% BRC water-based printing inks. In preferred embodiments, the solution resins and water-based printing inks have 100% BRC. Anionic solution resins for water-based printing inks with partial renewable carbon content have been available since the 1970s. It is not uncommon for resin producers to use natural products (e.g. gum rosin) as raw materials in their resin manufacture process. However, the amount of natural products used in the prior art inks is limited because the higher the content of natural products, the lower desirable properties, such as resistance. Current commercially available water-based solution resins do not meet the physical performance requirements at very high BRC. The present invention is the first time that it has been shown that resins having up to 100% bio-renewable carbon in the resin structure derived from natural sources also have robust physical performance known to those skilled in the art of water-based printing inks.

The bio-based carbon content (BRC) is determined using the standard method described in ASTM D6866 ("Standard Test Methods for Determining the Biobased Content of Natural Range Materials Using Radiocarbon and Isotope Ratio Mass Spectrometry Analysis"). See "Understanding biobased carbon content," Society of the Plastics Industry Bioplastics Council (February 2012). The application of ASTM D6866 to measure "bio-based content" is based on the same concepts as radiocarbon dating, but without using the age equations. The ratio of the amount of radiocarbon ($^{14}C$) in an unknown sample to that of a modern reference standard is determined. Fossil carbon contains no radiocarbon. The greater the amount of "new" carbon, the higher $^{14}C$. The ratio is reported as a percentage of the total carbon that is modern carbon, with the units "pMC" (percent modern carbon), or BRC (as a percentage). Some suppliers may assess a percentage of biobased content based on weight, based on the "recipe" the producer uses (i.e. how much of a natural material, such as cellulose, is present in a varnish containing cellulose and copolyester). However, it should be noted that the weight percent includes not just the contribution to the weight from the carbon, but also from the other elements in the materials. For the purposes of the present invention, the BRC content refers to the BRC as assessed using ASTM D6866.

Colophony, also known as rosin, comes from the sap of coniferous trees, such as pines, junipers, firs, and cedars. Colophony comprises high molecular weight unsaturated acids, including isomers of abietic type acids and pimaric type acids. Rosin is not a polymer, but rather it is a blend of distinct molecules. Rosin is a mixture of eight closely related rosin acids characterized by three fused six-carbon rings, double bonds that vary in number and location, and a single carboxylic acid group. Rosin acids are shown below.

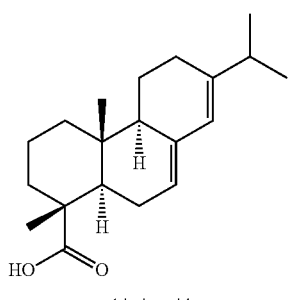

abietic acid

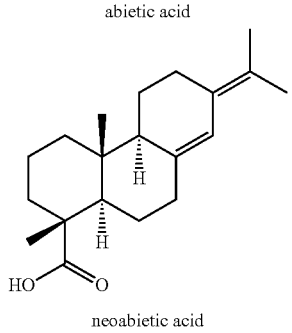

neoabietic acid

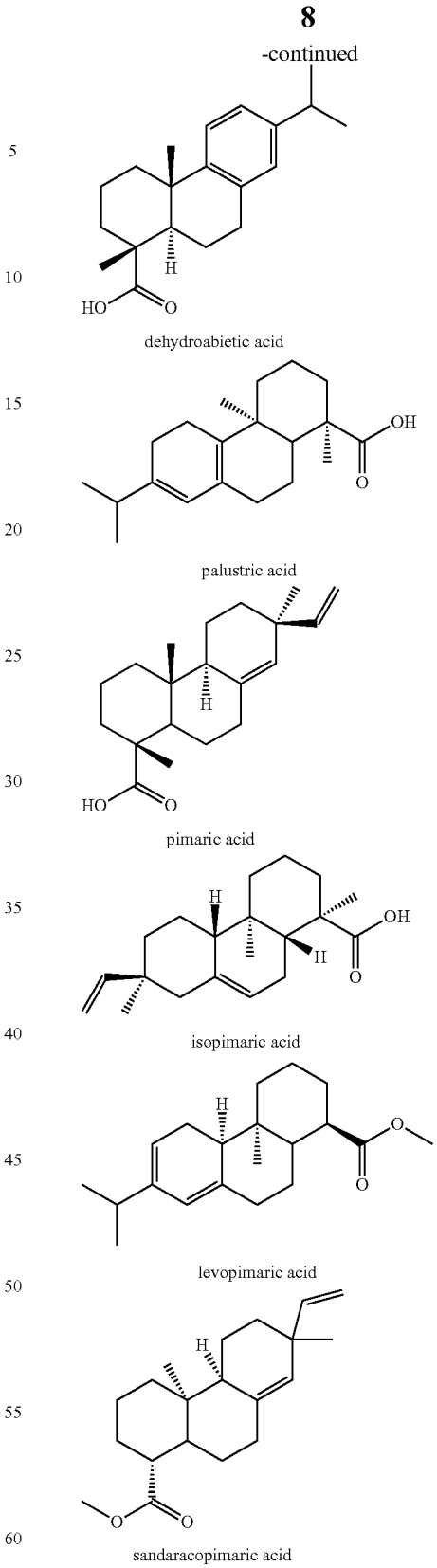

dehydroabietic acid palustric acid pimaric acid isopimaric acid levopimaric acid sandaracopimaric acid The ratios of each type of acid depends on the source of the colophony. Types of rosin include gum rosin, tall oil rosin, and wood rosin. Gum rosin is the oleoresin of the living pine tree. Wood rosin is harvested from the stump of pine trees by multiple extraction and distillation processes.

Tall oil rosin is a by-product of the Kraft process of wood pulp manufacture when pulping pine trees.

The incorporation of rosin, such as gum rosin, into a thermal adduct can be accomplished by several different chemical reactions, including dehydration/condensation and esterification. Rosin esters are produced between the rosin acid and an alcohol.

Rosin can be modified by the Diels-Alder reaction. Typically, maleic anhydride and fumaric acid are used when maximizing renewable carbon content is not a priority. Currently, neither acid is of natural recently living carbon origin. This reaction then produces a rosin derivative with increased acid groups. The increased acidity makes the modified rosin especially useful in ink applications.

The process for preparing the anionic modified rosin ester resins of the invention is a thermal adduction reaction. The process for preparing the anionic modified rosin resins of the invention typically comprises reacting a rosin with one or more organic acids having one or more hydroxyl groups, in a thermal adduction reaction, performed at a temperature of about 150° C. to 225° C. The reaction mixture typically comprises about 1 wt % to about 99 wt % of rosin, based on the total weight of the reactants. The reaction mixture typically comprises about 1 wt % to about 99 wt % organic acid, based on the total weight of the reactants. In certain preferred embodiments, the reaction mixture contains 1 wt % to 70 wt % rosin, and 30 wt % to 99 wt % organic acid, based on the total weight of the reactants. In preferred embodiments, the reaction mixture comprises a 1:1 stoichiometric ratio of rosin to organic acid, that is, a 1:1 molar equivalents based on the hydroxyl groups of the organic acid and the carboxyl groups of the rosin. The hydroxyl group of the organic acid reacts as an alcohol to increase the acid value of the rosin. The modified rosin ester resins typically have a BRC content of about 95% to about 100%, preferably 100%. The modified rosin ester resins typically have an acid value of about 100 mg KOH/g to about 400 mg KOH/g. Preferably, the acid value is less than about 220 mg KOH/g. The reaction may be performed under a nitrogen atmosphere. The reaction may be performed under vacuum.

The carboxylic acid group of gum rosin can be converted into an ester through a reaction with an alcohol. The alcohols typically used to make anionic rosin esters for the ink industry are methanol, triethylene glycol, glycerol, and pentaerythritol.

Of the alcohols primarily used to esterify rosin, glycerol is the only one that is obtained from plant and animal sources. Esterification of rosin with glycerol is well known. However, it reduces the acid value of the rosin compound, thereby reducing it suitability for use in printing inks. Advantageously, the inventors have identified organic acids of natural origin that can react onto rosin, thus increasing the acid value. These organic acids also possess a hydroxyl group, and can react as an alcohol in an esterification reaction. When these rosin adducts are then neutralized with ammonia, aqueous solutions having equal to or greater than 35% total non-volatiles (TNV) are realized and can then be successfully used in aqueous ink formulations. The rosin adducts can also be neutralized with higher amines.

Citric acid has one alpha hydroxyl group, and three carboxylic acid groups. It has the chemical formula $C_6H_8O_7$, and has the structure:

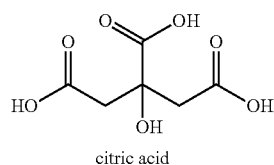 [SMILES: O=C(O)CC(O)(CC(=O)O)C(=O)O]

citric acid

Citric acid occurs naturally in fruits, and has a 100% BRC designation. While esterification of the rosin occurs with the hydroxyl group, the remaining carboxyl groups of citric acid increases the acid value of the rosin. Other suitable organic alcohols with hydroxyl groups include malic acid, lactic acid, tartaric acid, and ascorbic acid, having the following structures:

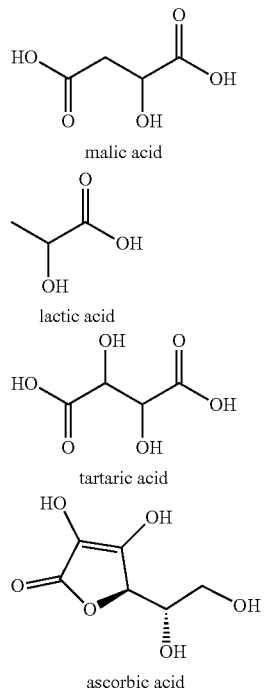

malic acid lactic acid tartaric acid ascorbic acid

A typical acid number for a pure rosin acid is around 170 mg KOH/g. The acid value for citric acid is 836 mg KOH/g. Esterification of the organic acid onto the rosin is not the only reaction occurring. Since citric acid possesses carboxyl acid groups and hydroxyl groups (of an alcohol), citric acid could undergo esterification, and thus react with itself. The acid value of the rosin/organic acid adduct can be controlled by the stoichiometry, the reaction temperature, and the reaction time. A higher reaction temperature accelerates the esterification of the hydroxyl group from the citric acid onto the carboxyl group of the rosin. The longer the reaction is allowed to proceed, the lower the acid value, until the reaction slows down and the decrease in acid value becomes minimal. In all cases, the acid value increases compared to pure rosin. Solubility of the reaction product is controlled primarily by the reaction temperature. At a reaction temperature of 175° C., when neutralized with ammonia only, a low solids (less than 10% TNV) solution is created. Higher amines are required to achieve a higher solids level of the 175° C. adduct. At a reaction temperature of 200° C., higher solids solution, greater than 30% TNV, can be achieved with ammonia neutralization. Formation of rosin dimer dicitrate at 200° C. (including 2 colophony units and 2 citric acid units) is the major structural difference to the 175° C. adduct (dimer with 1 colophony unit and 1 citric acid unit). Additionally, use of a vacuum can further reduce acid number of a 1 to 1 stoichiometric ratio (1 mole of rosin or abietic acid to one mole of citric acid) of colophony-citric acid (adduct reaction) from approximately 240 to 210 mg KOH/g. Greater ratios of gum rosin to either citric acid or 1-malic acid will result in finished adduct acid number of 150 to 210 mg KOH/g.

Typically, the rosin acid monomer or dimer is present in the thermal adduction reaction mixture in an amount of about 1 wt % to about 99 wt %, based on the total weight of the reactants. Preferably, the rosin acid monomer or dimer is present in the reaction mixture in an amount of about 1 wt % to about 70 wt %. It is to be understood that the recited numerical ranges include the endpoints, all of the values within the range, and all narrower ranges within the broad range. The amount of rosin acid monomer or dimer will be chosen based on the desired properties of the thermal adduct product. In certain embodiments, the rosin acid monomer or dimer is present in the reaction mixture in an amount of about 30 wt % to about 70 wt %, preferably about 30 wt % to about 55 wt %.

Suitable rosin monomers or dimers include, but are not limited to, gum rosin, tall oil rosin, wood rosin, derivatives thereof, and combinations thereof. In preferred embodiments, the rosin monomer or dimer is gum rosin.

Typically, the one or more organic acids having one or more hydroxyl groups, are present in the thermal adduction reaction mixture in an amount of about 1 wt % to about 99 wt %, based on the total weight of the reactants. Preferably, the organic acids having one or more hydroxyl groups are present in the reaction mixture in an amount of about 30 wt % to about 99 wt %, based on the total weight of the reactants. It is to be understood that the recited numerical ranges include the endpoints, all of the values within the range, and all narrower ranges within the broad range. The amount of rosin organic acids will be chosen based on the desired properties of the thermal adduct product. In certain embodiments, the organic acids are present in the reaction mixture in an amount of about 30 wt % to about 55 wt %, based on the total weight of the reactants.

Preferably, the organic acids are of natural origin. Suitable organic acids that have one or more hydroxyl groups include, but are not limited to, citric acid, malic acid, lactic acid, tartaric acid, ascorbic acid, and combinations thereof.

The ratio of rosin acid monomer or dimer to organic acid having one or more hydroxyl groups in the thermal adduction reaction mixture, in terms of molar equivalents of the hydroxyl groups of the organic acid and the carboxyl groups of the rosin, is about 1:99 to about 99:1. In preferred embodiments, the ratio is about 50:50 (i.e. 1:1).

In certain embodiments, the anionic modified rosin esters of the present invention are compounds of Formula I:

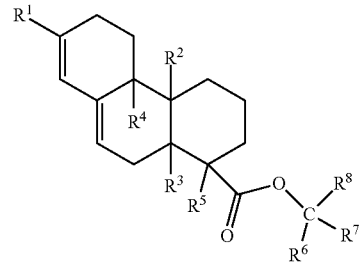

Formula I wherein:
$R^1$ is H, or —$C_1$-$C_{10}$alkyl;
$R^2$, $R^3$, $R^4$, and $R^5$ are each independently H, or —$C_1$-$C_{10}$alkyl;
$R^6$ and $R^8$ are each independently H, —COOH, —$C_1$-$C_{10}$alkyl-COOH, or —$C_1$-$C_{10}$alkyl;
$R^7$ is H, —COOH, —$C_1$-$C_{10}$alkyl-COOH, or —C(=O)O—$CR^9R^{10}R^{11}$;
Or $R^6$ and $R^7$ together with the carbon atom to which they are attached form a $C_3$-$C_6$ cycloalkyl, $C_3$-$C_6$ heterocycle, each of which is optionally substituted with one or more carbonyl groups;
$R^9$, $R^{10}$, and $R^{11}$ are each independently H, —COOH, or —$C_1$-$C_{10}$alkyl-COOH;
or
$R^9$ and $R^{10}$ together with the carbon atom to which they are attached form a $C_3$-$C_6$ cycloalkyl, or $C_3$-$C_6$ heterocycle, each of which is optionally substituted with one or more carbonyl groups.

In other embodiments, the anionic modified rosin esters of the present invention are compounds according to Formula II:

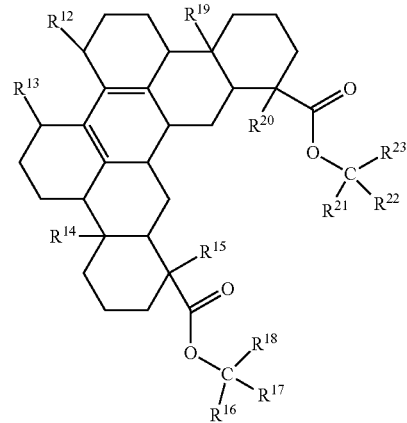

wherein:
$R^{12}$, $R^{13}$, $R^{14}$, $R^{15}$, $R^{19}$, and $R^{20}$ are each independently H, or —$C_1$-$C_{10}$alkyl;
$R^{16}$, $R^{18}$, $R^{21}$, and $R^{23}$ are each independently absent, H, —COOH, or —$C_1$-$C_{10}$alkyl-COOH;
or
$R^{16}$ and $R^{18}$ together with the carbon atom to which they are attached, and/or $R^{21}$ and $R^{23}$ together with the carbon atom to which they are attached form a $C_3$-$C_6$ cycloalkyl or $C_3$-$C_6$ heterocycle, each of which is optionally substituted with one or more carbonyl groups.

$R^{17}$ is H, —COOH, —$C_1$-$C_{10}$alkyl-COOH, or —C(=O)O—$CR^{24}R^{25}R^{26}$;

$R^{24}$, $R^{25}$, $R^{26}$ are each independently absent, H, —COOH, or —$C_1$-$C_{10}$alkyl-COOH;

or $R^{24}$ and $R^{25}$ together with the carbon atom to which they are attached form a $C_3$-$C_6$ cycloalkyl or $C_3$-$C_6$ heterocycle, each of which is optionally substituted with one or more carbonyl groups;

$R^{22}$ is H, —COOH, —$C_1$-$C_{10}$alkyl-COOH, or —C(=O)O—$CR^{27}R^{28}R^{29}$;

$R^{27}$, $R^{28}$, $R^{29}$ are each independently H, —COOH, or —$C_1$-$C_{10}$alkyl-COOH;

or $R^{27}$ and $R^{28}$ together with the carbon atom to which they are attached form a $C_3$-$C_6$ cycloalkyl or $C_3$-$C_6$ heterocycle, each of which is optionally substituted with one or more carbonyl groups.

It is to be understood that the compounds of the invention encompass all stereoisomeric forms (e.g. enantiomers, diastereomers, and other stereoisomeric forms), as well as their racemic and resolved forms, and mixtures thereof. Molecular weight of the thermal adduction products was measured by Time-of-Flight (ToF) LC-MS (Ultraperformance Liquid Chromatography (UPLC) with ToF) (Impact 2, from Bruker Daltonic, Bremen, Germany). The following parameters were used:

| Instrument Parameter | |
|---|---|
| Column | No column used; only a connector between the UPLC and the ToF installed, capillary length: 1 m |
| Oven temperature | 30° C. |
| Sample temperature | 20° C. |
| Isocratic flow of sample solution | 200 μl/min |

| Instrument Parameter - ToF | | | | | |
|---|---|---|---|---|---|
| Mode | ESI⁻ | Funnel 1 RF | 150.0 Vpp | Collision Energy | 10.0 eV |
| End Plate Offset | 500 V | Funnel 2 RF | 200.0 vpp | Collision RF | 1500 Vpp |
| Capillary | 4500 V | is CID Energy | 0.0 eV | Transfer Time | 100.0 μs |
| Nebulizer | 3.0 bar | Hexapole RF | 250.0 Vpp | Pre Pulse Storage | 9.0 μs |
| Dry Gas | 8.0 l/min | Ion Energy | 3.0 eV | Mass Range | 100-1800 |
| Dry Temp. | 200° C. | Low Mass | 50.0 m/z | Spectra Rate | 4 Hz |

Compound samples (raw materials) were weighed and dissolved in a mixture of acetone and water (90/10), to obtain sample solution concentrations of 200 μg/ml. With a syringe pump, the solutions were directly injected into the ToF system with a constant flow rate of 200 μl/min. Each sample was measured for 1 minute in the electrospray ionization (ESI)-mode, and from the middle of the measurement a sum mass spectrum (0.2-0.8 min) was generated. In some embodiments, the anionic modified rosin ester resins of the invention are selected from those in Table 1.

TABLE 1

Anionic modified rosin ester resins

| Cmpd # | Structure | Name and molecular weight |
|---|---|---|
| 1 | 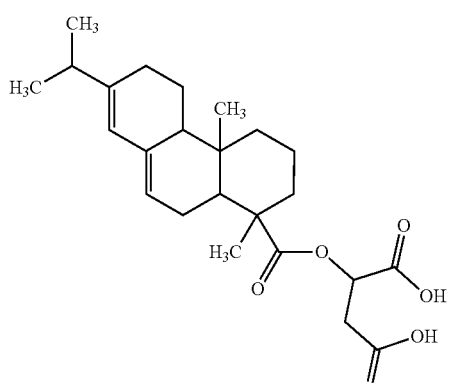 | 2-((7-isopropyl-1,4a-dimethyl-1,2,3,4,4a,4b,5,6,10,10a-decahydrophenanthrene-1-carbonyl)oxy)succinic acid [M − H]⁻ = 417.2288 |

TABLE 1-continued

Anionic modified rosin ester resins

| Cmpd # | Structure | Name and molecular weight |
| --- | --- | --- |
| 2 | | 2,2'-((7,8-diisopropyl-1,4a,10b,14-tetramethyl-1,2,3,4,4a,4b,5,6,7,8,9,10,10a,10b,11,12,13,14,14a,15,15a,15b,16,16a-tetracosahydrodibenzo[fg,ij]pentaphene-1,14-dicarbonyl)bis(oxy))disuccinic acid<br>$[M - H]^- = 835.4640$ |
| 3 | | 2-(3-((7-isopropyl-1,4a-dimethyl-1,2,3,4,4a,4b,5,6,10,10a-decahydrophenanthrene-1-carbonyl)oxy)-2,5-dioxotetrahydrofuran-3-yl)acetic acid<br>$[M - H]^- = 457.2231$ |
| 4 | | 2-(((3-carboxy-2,5-dioxotetrahydrofuran-3-yl)oxy)carbonyl)-2-((7-isopropyl-1,4a-dimethyl-1,2,3,4,4a,4b,5,6,10,10a-decahydrophenanthrene-1-carbonyl)oxy)succinic acid<br>$[M - H]^- = 587.2498$ |

TABLE 1-continued

Anionic modified rosin ester resins

| Cmpd # | Structure | Name and molecular weight |
|---|---|---|
| 5 | | 3,3'-((7,8-diisopropyl-1,4a,10b,14-tetramethyl-1,2,3,4,4a,4b,5,6,7,8,9,10,10a,10b,11,12,13,14,14a,15,15a,15b,16,16a-tetracosahydrodibenzo[fg,ij]pentaphene-1,14-dicarbonyl)bis(oxy))bis(2,5-dioxotetrahydrofuran-3-carboxylic acid) [M − H]⁻ = 915.4583 |
| 6 | | 2-((7-isopropyl-1,4a-dimethyl-1,2,3,4,4a,4b,5,6,10,10a-decahydrophenanthrene-1-carbonyl)oxy)propane-1,2,3-tricarboxylic acid [M − H]⁻ = 475.2337 |
| 7 | | 2-((7-isopropyl-1,4a-dimethyl-1,2,3,4,4a,4b,5,6,10,10a-decahydrophenanthrene-1-carbonyl)oxy)-2-methylsuccinic acid [M − H]⁻ = 431.2470 |

In certain embodiments, the modified rosin is neutralized, for example with ammonia or higher amines, and included in an aqueous printing ink, thus increasing the BRC content of the finished ink. Advantageously, the inks incorporating the modified rosin of the present invention exhibit physical properties (e.g. adhesion, resistance, etc.) that are equal to or better than those of existing ink systems.

The inks made using the rosin adducts of the present invention would typically be used in water-based printing inks for a wide variety of substrates and end-use applications. Preferred substrates and applications include coated and uncoated paper and board stock used in the fast food packaging industry. However, the inks of the present invention are not limited to just this application, and could be used anywhere that water-based printing inks are found.

The inks of the present invention, using the anionic modified rosin esters of the present invention, have a higher BRC content than what is currently within the art. Currently available finished inks using organic pigments and commercially available BRC solution resins have 20% to 25% BRC. The inks of the present invention contain up to 100% BRC. When inorganic pigments are substituted for current zero BRC organic pigments within finished inks comprising the anionic modified rosin ester resins of the present invention, a BRC range of 99% to 100% would result.

The present invention also provides water-based compositions comprising the anionic modified rosin ester of the present invention.

Typically, the modified rosin ester is present in the water-based composition in an amount of about 5 wt % to about 80 wt %, based on the total weight of the composition. For example, the modified rosin ester may be present in the water-based composition in an amount of about 5 wt % to about 70 wt %, based on the total weight of the composition; or about 5 wt % to about 60 wt %; or about 10 wt % to about 80 wt %; or about 10 wt % to about 60 wt %. It is to be understood that the recited numerical ranges include the endpoints, all of the values within the range, and all narrower ranges within the broad range.

Typically, the water is present in the water-based composition in an amount of about 5 wt % to about 80 wt %, based on the total weight of the composition. For example, the water may be present in the water-based composition in an amount of about 5 wt % to about 70 wt %, based on the total weight of the composition; or about 5 wt % to about 60 wt %; or about 10 wt % to about 80 wt %; or about 10 wt % to about 60 wt %. It is to be understood that the recited numerical ranges include the endpoints, all of the values within the range, and all narrower ranges within the broad range.

Although the present invention is drawn to water-based systems, there may also be small amounts of organic solvents in the water-based compositions. When organic solvents are present, the compositions of the present invention typically comprise about 0.1 wt % to about 50 wt % solvents, based on the total weight of the composition. Preferably, the water-based compositions comprise about 0.1 wt % to about 10 wt % organic solvents, based on the total weight of the composition. It is to be understood that the recited numerical ranges include the endpoints, all of the values within the range, and all narrower ranges within the broad range.

In preferred embodiments, one or more of the organic solvents used in the inks of the present invention are bio-based solvents (natural materials). Bio-solvents are renewable and non-toxic. Biomass is a renewable resource for producing bio-solvents. For example, starch, lignocellulose, plant oils, animal fats and proteins can be used to synthesize various bio-derived solvents, including, but not limited to, acids, alkanes, aromatics, ionic liquids (ILs), furans, esters, ethers, liquid polymers and deep eutectic solvents (DESs). Bio-solvents include, but are not limited to, bio-alcohols, bio-ethers, bio-esters, bio-acids, bio-fatty acid methyl esters. In certain embodiments, bio-alcohols are preferred. A preferred bio-alcohol is bio-propanol. Blends of bio-solvents are also suitable for use in the inks of the present invention. Suitable bio-solvents include, but are not limited to, PRO-100™ (chimista Specialty Chemicals); Augeo™ (Solvay); and Cyrene™ (dihydrolevoglucosenone; Circa Group). In the coatings industry, PRO-100™ is a useful bio-solvent blend that can be used in industrial, architectural, DTM (Direct to Metal), and other coatings and coating application. The solubility parameters of PRO-100™ are similar to those of n-propanol, making it an excellent bio-based, performance alternative for formulators wanting to increase the bio-renewable carbon content in their formulations. PRO-100™ contains greater than 95% bio-renewable carbon.

Preferably, the organic solvents of the inks of the present invention contain equal to or greater than 1 wt % bio-solvents, based on the total weight of the solvents. For example, the solvents contain about 1 wt % to about 100 wt % bio-solvent, based on the total weight of the solvents. For example, the bio-solvents may be present in an amount of about 1 wt % to about 90 wt %, based on the total weight of the solvents. Advantageously, 100% of the solvents are bio-solvents. It is to be understood that the recited numerical ranges include the endpoints, all of the values within the range, and all narrower ranges within the broad range.

The water-based compositions of the invention preferably use materials that have 70% to 100% BRC content, such as 90% to 100% BRC content, and most preferably the materials are 100% BRC content. Suitable additives include, but are not limited to, modifying resins (e.g. protein), adhesion promoters, silicones, light stabilizers, optical brighteners, de-gassing additives, neutralizing agents, flow promoters, defoamers, antioxidants, stabilizers, surfactants, dispersants, plasticizers, rheological additives, waxes, silicones, etc. When present, the additives are independently present in an amount of about 0.1 wt % to about 10 wt %, based on the total weight of the composition.

The water-based compositions may contain waxes. Preferably, the waxes are natural materials, and have a BRC content of about 70% to about 100%, more preferably about 90% to about 100%, and most preferably 100%. Suitable waxes include, but are not limited to, amide wax, erucamide wax, polypropylene wax, paraffin wax, polyethylene wax, polytetrafluoroethylene wax, carnuba wax, soybean wax, and combinations thereof. When present, waxes are typically present in the water-based compositions in an amount of about 0.1 wt % to about 10 wt %, based on the total weight of the composition. Preferably, the wax is present in an amount of about 0.1 wt % to about 4 wt %, or about 0.1 wt % to about 2 wt %.

Understanding that many 100% BRC pigments are currently in development, the colorant may be any pigment that can be employed in printing inks. The colorants may be organic or inorganic, and may be dyes or pigments. Preferably the colorants are of natural origin, and preferably have a BRC content of about 70% to about 100%. In certain embodiments, the colorants are provided as dispersions or emulsions, for example, as pigment dispersions. Suitable colorants include pigments (such as, but not limited to, mineral pigments) and dyes (such as, but not limited to, plant based dyes). Suitable colorants include, but are not limited to, ultramarine blue derived from lapis lazuli, Linablue derived from *Spirulina*, iron-oxide pigments, copper pigments, titanium pigments, zinc pigments, aluminum pigments, carbon pigments, and combinations thereof. Suitable colorants include, but are not limited to, inorganic pigments, such as Pigment White 6 (Titanium Dioxide), Pigment Black 7 (carbon black), Pigment Black 11 (Black Iron Oxide), Pigment Red 101 (Red Iron Oxide) and Pigment Yellow 42 (Yellow Iron Oxide), Pigment Yellow 184, Pigment Blue 27 and organic pigments such as Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment 26Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 4, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23 and the like.

Suitable inorganic pigment chemistries include, but are not limited to, Iron Oxide Red, Iron Oxide Yellow, Iron Hexacyanate Blue 27, Bismuth Vanadate Yellow 184 and titania (TiO2), while suitable organic pigments include, but are not limited to, phthalocyanines, antrhraquinones, perylenes, carbozoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, and anthrapyrimidines. It will be recognized by those skilled in the art that organic pigments are differently shaded, or even have different colors, depending on the functional groups attached to the main molecule.

The dyes include but are not limited to azo dyes, anthraquinone dyes, xanthene dyes, azine dyes, combinations thereof and the like.

The colorant employed in the present invention may be any FD&C or D&C pigment. Preferred FD&C pigments include FD&C Red No. 40, FD&C Yellow No. 5, FD&C Yellow No. 6 and FD&C Blue No. 1. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10.

When present, colorants are typically present in the water-based compositions in an amount of about 1 wt % to about 70 wt %, based on the total weight of the composition. For example, colorants may be present in an amount of about 5 wt % to about 60 wt %, or about 5 wt % to about 50 wt %.

The water-based compositions of the invention have a BRC content of about 10% to about 100%. For example, the water-based compositions may have a BRC content of about 20% to about 100%; or about 40% to about 100%. Preferably, the water-based compositions have a BRC content of about 70% to about 100%, more preferably about 90% to about 100%, and most preferably of about 100%.

The water-based compositions of the present invention can be varnishes, technical varnishes, pigment grind vehicles, pigment dispersions, ink or coating vehicles, coatings, or finished inks.

The present invention provides printed substrates having applied thereon one or more water-based coatings of the invention. The present invention also provides articles comprising the printed substrates. In certain embodiments, the articles are packaging materials, such as food packaging materials or containers.

EXAMPLES

The invention is further described by the following non-limiting examples which further illustrate the invention, and are not intended, nor should they be interpreted to, limit the scope of the invention.

Example A. Synthesis of Anionic Modified Rosin Ester Resins

Anionic modified rosin ester resins were prepared. The effects of reaction temperature, reaction time, and use of vacuum on acid value and percent solids were assessed. The thermal adduct reaction were neutralized with ammonia (at equal to or greater than 16.67% of the KOH acid number weight before neutralization), which shows an equal neutralizing effect. The percent solids, pH, and viscosity of each neutralized thermal adduct were measured. Results are shown in Table 2.

Viscosity was determined using a Brookfield viscometer, #60 spindle, at 25° C. Viscosity is given in cps.

Synthesis Steps

A thermal adduction reaction was performed using gum rosin and 100% BRC organic acid, either citric acid or malic acid as indicated in Table 2 below. Gum rosin and the 100% BRC organic acid (67 wt % gum rosin/39 wt % citric acid) were charged to a round bottom, four-neck flask equipped with a mechanical stirrer, a reflux condenser with a Dean-Stark trap, a thermometer, and a nitrogen inlet. Heat was applied using a mantle heater to a set temperature, either 175° C. or 200° C., as shown in Table 2 below. When the colophony-citric acid reaction was run at 200° C., the thermal adduct was discharged when an acid value of 200 to 240 mg KOH/g was attained. When the colophony-malic acid reaction was run at 200° C., the thermal adduct was discharged when an acid value of 280 to 295 mg KOH/g was attained. When the colophony-citric acid reaction was run at 200° C. and a vacuum was in use, the thermal adduct was discharged when an acid value of 215 mg KOH/g or lower was attained.

Determination of Acid Value

Approximately 0.30 g of sample (thermal adduct) was weighed into a clean Erlenmeyer flask to the nearest 0.01 g. A 1:1 mix of toluene: isopropanol was used as the solvent, neutralized before use. Solvent was added to the flask, a stir bar was placed in the flask, and the mixture was stirred until the sample was dissolved. Gentle heating aided the process. The solution was cooled to room temperature (about 22° C. to 30° C.) and 3 to 6 drops of 1% alcoholic phenolphthalein solution was added. The solution was titrated with standardized 0.1 N alcoholic potassium hydroxide (KOH) to first point color which lasted for 15 seconds. The volume (ml) of KOH solution titrated was recorded. Acid value was calculated as follows:

(ml KOH titrated×5.61)/weight of sample=acid value (mg KOH/g)

TABLE 2

Colophony-organic acid adducts

| ID | Temp/time (° C./hrs) | Acid value (mg KOH/g) | Neutralized thermal adduct | | |
|---|---|---|---|---|---|
| | | | % solids (% TNV) | pH | Viscosity (cps) |
| R4231-40 | 175/4 | 313 | 10.7 | 9.5 | 500 |
| R4231-56 | 175/4 | 345 | 7.2 | 9.5 | 500 |
| R4231-122 | 200/4 | 235 | 42.2 | 9.5 | 500 |
| R4231-136 | 200/4 | 292 | 43.5 | 9.4 | 500 |
| R4231-157 | 200/4 (under vacuum for the final 15 minutes) | 215 | 44.0 | 9.4 | 500 |

R4231-40 is a colophony-malic acid adduct
R4231-56 is a colophony-citric acid adduct
R4231-122 is a colophony-citric acid adduct
R4231-136 is a colophony-malic acid adduct
R4231-157 is a colophony-citric acid adduct
Note
that the malic acid is l-malic acid.

The data show that neutralization with ammonia, without the need for higher amines, is sufficient to attain a % TNV of equal to or greater than 20% and a viscosity of 500 cps when the thermal adducts are reacted at 200° C. for 4 hours. Persons skilled in the art understand that resins with acid numbers less than 220 mg KOH/g show the best viscosity stability with organic pigments over a period of 72 hours at 120° F. (~49° C.). Rosin-citrate R4231-157 was used to make finished ink Examples 2, 3, and 4, due to the acid number of 215.

Examples 1 to 3. Preparation of Pigment Grinding Vehicles

The thermal adducts from Example A were used to prepare pigment grinding vehicles. The formulations are shown in Tables 3 to 5.

TABLE 3

Example 1 - 100% BRC pigment grinding vehicle

| Material | wt % |
|---|---|
| Water | 24.0 |
| 15% ammonia solution | 39.9 |
| Silicone Defoamer | 0.1 |
| ADD WHILE MIXING | |
| R4231-136 Adduct | 36.0 |
| MIX UNTIL DISSOLVED | |
| Total | 100 |

Example 1 100% BRC pigment grinding vehicle was made using the 200° C. colophony-malic acid adduct R4231-136. The viscosity of Example 1 was 100 cps at a pH of 9.4.

TABLE 4

Example 2 - 100% BRC pigment grinding vehicle

| Material | wt % |
|---|---|
| Water | 41.5 |
| 15% ammonia solution | 22.4 |
| Silicone Defoamer | 0.1 |
| ADD WHILE MIXING | |
| R4231-122 Adduct | 36.0 |
| MIX UNTIL DISSOLVED | |
| Total | 100 |

Example 2 100% BRC pigment grinding vehicle was made using the 200° C. colophony-citric acid adduct R4231-122. The viscosity of Example 2 was 80 cps at a pH of 9.4.

TABLE 5

Example 3 - 100% BRC pigment grinding vehicle

| Material | wt % |
|---|---|
| Water | 44.8 |
| 15% ammonia solution | 19.1 |
| Silicone Defoamer | 0.1 |
| ADD WHILE MIXING | |
| R4231-157 Adduct | 36.0 |
| MIX UNTIL DISSOLVED | |
| Total | 100 |

Example 3 100% BRC pigment grinding vehicle was made using the 200° C. colophony-citric acid adduct, under vacuum for the final 15 minutes of the reaction, R4231-157. The viscosity of Example 3 was 90 cps at a pH of 9.4.

Note that Examples 1 to 3 are ~100% BRC in terms of both the overall content of the formulation, as well as 100% BRC in terms of the solids content of the vehicle.

Examples 4 to 6. Inorganic Pigment Color Dispersions

Inorganic pigment dispersions were prepared using Example 2 as the pigment grind vehicle. The percent solids are shown in Table 6.

TABLE 6

Examples 4 to 6 inorganic pigment color dispersions

| Ex. # | Inorganic pigment | Total Solids | Pigment Solids | 100% BRC Solids (from Example 2) |
|---|---|---|---|---|
| 4 | Oxide Red 101 | 67.0 | 55.0 | 12.0 |
| 5 | Oxide Yellow 42 | 60.3 | 50.0 | 10.3 |
| 6 | Yellow 184 | 49.7 | 40.0 | 9.7 |

In terms of % BRC, all of the carbon (100%) in the pigment color dispersion is BRC.

Examples 7 to 9. Finished Inks with 100% BRC Content

The proportion of the solids that is carbon-containing (i.e. not the inorganic pigment) is 12 wt %. Finished inks were prepared using the inorganic pigment dispersions Examples 4 to 6. The formulations are shown in Tables 7 to 9 below.

TABLE 7

Example 7 finished ink - 100% BRC oxide red

| Material | wt % |
|---|---|
| Inorganic dispersion Example 4 | 64 |
| BRC Defoamer | 1 |
| Carnauba wax emulsion | 4 |
| Water | 16 |
| Ammonia | 9 |
| Add while mixing | |
| 100% BRC Protein | 6 |
| Total | 100 |

Example 7 finished ink had a viscosity of 875 cps at a pH of 9.6.

TABLE 8

Example 8 finished ink - 100% BRC oxide yellow

| Material | wt % |
|---|---|
| Inorganic dispersion Example 5 | 64 |
| BRC Defoamer | 1 |
| Carnauba wax emulsion | 4 |
| Water | 16 |
| Ammonia | 9 |
| Add while mixing | |
| 100 BRC Protein | 6 |
| Total | 100 |

Example 8 finished ink had a viscosity of 1050 cps at a pH of 9.3.

TABLE 9

Example 9 finished ink - 100% BRC yellow 184

| Material | % |
|---|---|
| Inorganic dispersion Example 6 | 64 |
| BRC Defoamer | 1 |
| Carnauba wax emulsion | 4 |
| Water | 16 |
| Ammonia | 9 |
| Add while mixing | |
| 100 BRC Protein | 6 |
| Total | 100 |

Example 9 finished ink had a viscosity of 720 cps at a pH of 9.6.

Example 10. Comparative Example 10 Finished Ink with Low BRC

A commercially available ink containing BRC content was used as a comparative ink. Comparative Example 10 was R4181-67C Aquagreen Finished Red (Sun Chemical), having 24.81% BRC content, viscosity of 1200 cps, and a pH of 9.3. Aquagreen Finished Red contains 50 wt % RFD4241 Flexiverse Red 22 dispersion, and 50 wt % Aquagreen technical vehicle.

Example 11. R4181-92A 100% BRC Pigment Grinding Varnish and Vehicle

The formulation of Example 11 is shown in Table 10.

TABLE 10

Example 11 - R4181-92A 100% BRC pigment grinding varnish and vehicle

| Material | wt % |
|---|---|
| Water | 27.1 |
| 88% l-Lactic acid in water | 10.2 |
| Silicone Defoamer | 0.1 |
| ADD WHILE MIXING | |
| R4231-157 | 23.7 |

TABLE 10-continued

Example 11 - R4181-92A 100% BRC pigment grinding varnish and vehicle

| Material | wt % |
|---|---|
| MIX HIGH SPEED TO 100 F. AND UNIFORM ADD WHILE MIXING TO pH = 6.50 | |
| Ammonia 14% in water | 11.3 |
| MIX 10 MINUTES AND ADD RAPIDLY | |
| Ammonia 14% in water | 17.1 |
| ADD WHILE MIXING IN ORDER | |
| 25% Carnauba Wax Emulsion | 6.2 |
| Micronized EBS wax | 2.0 |
| Silicone Slip Agent | 0.3 |
| WHEN FULLY DISSOLVED AND pH >9.0 ADD WHILE MIXING | |
| Zinc Crosslinking Agent | 2.0 |

The viscosity of Example 11 was 670 cps at a pH of 9.6.

Examples 12 to 15. Finished Inks

Example 11 pigment grinding varnish and vehicle was used to prepare finished inks, Examples 12 to 14. Example 15 is current state of the art comparative control for finished ink physical performance. Example 15 had 23.2% BRC content, as determined by $^{14}C$ analysis. The formulations of Examples 12 to 15 are shown in Tables 11 to 14.

TABLE 11

Example 12 - 100% BRC oxide yellow

| Material | % |
|---|---|
| R4181-92A 100 BRC Vehicle | 54.5 |
| Iron Oxide Yellow 42 Pigment | 38.0 |
| Disperse High Sheer to <1 um average particle size, then add | |
| Water | 7.5 |
| Total | 100 |

Example 12 finished ink has a pH of 9.4, and a viscosity of 35 sec using a #2 EZ Zahn cup.

TABLE 12

Example 13 - 100% BRC yellow 184

| Material | wt % |
|---|---|
| R4181-92A 100 BRC Vehicle | 59.0 |
| Bismuth Vanadate Yellow 184 Pigment | 24.5 |
| Water | 11.5 |
| Premix 30 Minutes high speed, then pass thru media mill to <0.8 um average particle size, then add | |
| Water | 3.0 |
| Ammonia 15% | 2.0 |
| Total | 100 |

Example 13 finished ink had a pH of 9.6, and viscosity of 34 seconds using a #2 EZ Zahn cup.

TABLE 13

| Example 14 - 100% BRC ultramarine blue 29 | |
| --- | --- |
| Material | wt % |
| R4181-92A 100 BRC Vehicle | 62.2 |
| Ultramarine Blue 29 Pigment | 37.8 |
| Mix low sheer 10 minutes | |
| Total | 100 |

Example 14 finished ink had a pH of 9.0, and a viscosity of 29 seconds using a #2 EZ Zahn cup.

Note that Examples 11 to 14 are about 100% BRC in terms of both the overall content of the formulations, as well as 100% BRC in terms of the solids content of the vehicle. The following pigments do not contain any significant carbon in their supplied form:

Iron oxide yellow 42—composed of $Fe_2O_3+H_2O$ or $FeO(OH)+H_2O$

Bismuth vanadate yellow 184—composed of $BiVO_4$

Untramarine blue 29—composed of $Na_{6-8}Al_6Si_6O_{24}S_{2-4}$

TABLE 14

| Comparative Example 15 - 23.2% BRC Aquagreen red 22 | |
| --- | --- |
| Material | wt % |
| RGD2222 Pigment Red 22 dispersion in Styrenated Acrylic 50.3% solids, Zero BRC | 50.0 |
| GP37000030A Aquagreen Vehicle 41.7% solids, 51.18% BRC | 50.0 |

Comparative Example 15 had a pH of 9.2, and a viscosity of 32 seconds using a #2 EZ Zahn cup.

Example 16. Properties of Finished Ink Examples 7 to 9, and Comparative Example 10

Finished ink Examples 7 to 9 were tested for various properties and compared to comparative Example 10. Comparative Example 10 is a commercially available ink formulated for similar end-use applications (e.g. fast food packaging applications, including cold cups, sandwich wraps and display containers). As indicated above, comparative Example 10 has only 24.81% BRC. This is 75.19% lower than Examples 7 to 9.

TABLE 15

| Properties of finished inks | | | | |
| --- | --- | --- | --- | --- |
|  | Ex. 10 | Ex. 7 | Ex. 8 | Ex. 9 |
| % BRC | 24.81 | 100 | 100 | 100 |
| Sutherland dry rub density transfer | M = 0.046 | M = 0.052 | Y = 0.034 | Y = 0.037 |
| Sutherland dry-wet rub | Pass | Pass | Pass | Pass |
| Water kinetic | M = 0.022 | M = 0.044 | Y = 0.031 | Y = 0.037 |
| Ketchup/mustard/mayo | Pass | Pass | Pass | Pass |
| Coke, vegetable oil | Pass | Pass | Pass | Pass |
| 400° F. (~204° C.) sled | Pass | Pass | Pass | Pass |
| PE/water/cotton wipe | 9 | 9 | 10 | 10 |
| Carry up/ink lay | Pass | Pass | Pass | Pass |
| Aged at 120° F. (~49° C.) | No issues | No issues | No issues | No issues |

Table 15 is a compilation of data for critical physical properties of finished inks currently employed for sustainable ink performance. Some of these tests are geared towards food packaging, more specifically fast-food packaging applications (e.g. resistance to various food condiments), while others are for more general physical properties.

The data in Table 15 show that finished inks prepared with the 100% BRC resins of the present invention perform as well as or better than commercially available inks having low BRC content. This is unexpected because it has generally been accepted that increasing the amount of BRC content in finished inks will be detrimental to the necessary properties. This is important because, with use of the anionic modified rosin ester resins of the present invention, it is possible to develop inks that are sustainable, and thus better for the environment.

Example 17. Properties of Finished Inks 12 to 14, and Comparative Example 15

Finished inks Examples 12 to 14 were tested for various properties and compared to comparative ink Example 15 (control). Comparative Example 15 is a commercially available ink formulated for similar end-use applications (e.g. fast food packaging applications, including cold cups, sandwich wraps and display containers). As indicated above, comparative Example 15 has 23.2% BRC. This is 76.8% lower than Examples 12 to 14. The results are shown in Table 16. Table 16 is a compilation of data for critical physical properties of finished inks currently employed for sustainable ink performance. Some of these tests are geared towards food packaging, more specifically fast-food packaging applications (e.g. resistance to various food condiments), while others are for more general physical properties.

TABLE 16

| Properties of finished inks | | | | |
| --- | --- | --- | --- | --- |
|  | Ex. 12 | Ex. 13 | Ex. 14 | Ex. 15 |
| % BRC | 100 | 100 | 100 | 23.2 |
| Sutherland rub resistance | Y = 0.027 PASS | Y = 0.021 PASS | C = 0.019 PASS | M = 0.026 PASS |
| Water kinetic transfer | Y = 0.018 PASS | Y = 0.019 PASS | C = 0.011 PASS | M = 0.032 PASS |
| Condiment resistance | 1 = no visible ink transfer | 1 = no visible ink transfer | 1 = no visible ink transfer | 1 = no visible ink transfer |

TABLE 16-continued

| Properties of finished inks | | | | |
|---|---|---|---|---|
| | Ex. 12 | Ex. 13 | Ex. 14 | Ex. 15 |
| Coke ® resistance | No significant ink transfer | No significant ink transfer | No significant ink transfer | No significant ink transfer |
| Heat resistance inspection [400° F. (~204° C.) sled] | No ink found in non-print areas - PASS | No ink found in non-print areas - PASS | No ink found in non-print areas - PASS | No ink found in non-print areas - PASS |

The data in Table 16 show that finished inks prepared with the 100% BRC resins of the present invention perform as well as or better than commercially available inks having low BRC content. This is unexpected because it has generally been accepted that increasing the amount of BRC content in finished inks will be detrimental to the necessary properties. This is important because, with the use of the anionic modified rosin ester resins of the present invention, it is possible to develop inks that are sustainable, and thus better for the environment.

Methods

Application of Ink Samples

Finished ink samples were reduced with water to a viscosity of 25 seconds using #2 EZ Zahn cup. Finished inks were applied with a 200 line 7.8 BCM hand proofer to the polyethylene (PE) side of polyethylene coated paper, dried in a 120° F. convection oven for 30 seconds, then allowed to cure in ambient conditions for equal to or greater than 16 hours.

Dry Cycles

The dry cycles test is a Sutherland Rub mechanical transfer test using the printed finished ink samples.

The printed sheet was mounted to the 2# sled, ink side down, facing an unprinted PE surface of the same stock, which was mounted onto the Sutherland base. The test consisted of 25 cycles of rubbing. Ink density was measured with an X-Rite 939 spectrophotometer using the setting D65/10. A measurement taken from the non-test area (i.e. non-ink transfer) portion of the substrate density was subtracted from the (major contribution V, C, M, Y) measured density of the highest ink transfer area to determine ink transfer only. X-Rite transfer density must be less than 0.100 to pass established/historical print industry mechanical rub requirements. Major color contribution is automatically determined by many densitometers like X-Rite 939. It is the dominant reflectance wavelength of visible light in terms of Yellow (Y), Magenta (M), Cyan (C), and Black (V). An example of dominant absorbance is Magenta for a pink, and Cyan for a dark forest green.

Dry-Wet

This type of Sutherland rub test is used as an industry standard for inks printed on Cold Cup applications. Unprinted stock was mounted (PE side down) to a 4# sled. Printed sample was placed face up on the base of the run tester (that is, cup nesting alignment). The first 25 cycles were run dry, followed by 25cycles over the same area wetted with 5 g of water. No significant ink transfer to unprinted stock or color in the water puddle is allowed for a "pass" rating. No significant ink transfer is judged by whether or not it can be seen with the naked eye. The human eye generally cannot detect an X-Rite 939 density below 0.015 for V, C, M, Y, therefore if the transferred ink density is less than 0.015, the transferred ink cannot be seen, and the sample passes the dry-wet test.

Water Kinetic

This is a water wetted napkin quantitative mechanical rub transfer test. Ink was applied and cured, as described above, to 16# bleached Sandwich Wrap stock. A fully water wetted napkin was pulled laterally over a 4 inch run of printed stock with a 2# Sutherland sled on top. A 3 inch by 4 inch piece of copy paper was placed between the sled and the wetted napkin to hold all the layers together during the test. The napkin was then dried. The X-rite 939 density (major contribution V, C, M, Y) was taken for non-ink background, and the area of greatest ink transfer. Background density was subtracted from the ink transfer area, to determine the ink only transfer density. Historical ink transfer density values must be less than 0.050 to be acceptable by industry standards.

Condiment (Ketchup, Mustard, Mayonnaise, Vegetable Oil)/Fast Food Applications

This test evaluated ink transfer to a napkin with gentle hand wipe-away of condiment over printed ink. The PE side of PE coated bleached cup stock was printed with the inks. The test employed the printed/cured PE side of PE coated bleached cup stock listed above. Each condiment was placed onto an ink area of printed stock in 1 inch (2.54 cm) diameter circles. After 15 seconds, a napkin was used to remove the condiment. The napkin was inspected for ink transfer, and rated on a 1 to 5 scale: 1—no visible ink transfer; 2=barely perceptible transfer of ink; 3=slight transfer of ink; 4=moderate transfer of ink; 5=excessive transfer of ink. A passing result shows slight to no ink transfer (1-3 rating) on the napkin.

Beverage Resistance (Coke®)

This is a 5-minute soda-ink contact soak test with napkin wipe away. The ink was applied and cured on the PE side of PE coated bleached cup stock. The soda was applied in a puddle, about 1 inch (2.54 cm) in diameter. After 5 minutes, the soda was wiped away gently. The napkin was evaluated for ink transfer or bleed with non-aggressive wipe-away. No ink removal/transfer was allowed for a pass designation.

Heat resistance (400° F. Sled)

This is a mechanical-heat resistance test method for the preprint clamshell applications, where a printed sheet is thermally laminated to a corrugated board. Ink was applied to 16# bleached sandwich wrap stock, and cured as described above. A Sutherland rub tester 400° F. heated 2# sled was placed directly onto the printed ink for 100 cycles of heated contact. The print was orientated for the hot sled to move through ink and non-ink areas. Upon visual inspection of heat contact areas, no ink transfer to non-print areas was allowed for a passing designation.

PE/Water Cotton Wipe

This is a water wetted mechanical rub test, within the cold cup application. The inks were applied and cured on the PE side of PE coated bleached cup stock, as described above. Printed samples were soaked in room temperature water for 15 minutes. Prints were removed from the water and aggressively wiped with a wetted cotton cloth. No removal or transfer is allowed to pass this test.

Carry Up/Ink Lay

The prints were observed for any noticeable ink deposition issues. Inks were applied and cured on the PE coated side of PE coated bleached cup stock, and on 16# bleached sandwich wrap stock. The inks were applied at a viscosity of 25 seconds EZ Zahn #2, using a 200 line 7.8 BCM hand proofer. No fisheyes, pinholes, streaks, skips, or non-uniform lay allowed for a pass designation.

Aged 120° F. (~49° C.)

This test was used to determine the wet stability of the ink. Initial ink viscosity was reduced to 24 seconds on a #2 EZ Zahn cup with water, then re-measured after the ink was stored for 24 hours at 120° F. (~49° C.). Both the initial and 24 hour viscosities were measured with the ink at 70° F. (~21° C.). Elevated viscosity after 24 hours of storage indicated reactivity between ink components. Ink viscosity must not elevate more than 5 seconds over 24 hours at 120° F. (~49° C.) to receive a passing grade.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A mixture of anionic modified rosin esters, wherein the mixture is the reaction product of:
   (a) 1 wt % to 65 wt % of one or more rosin acid monomers or dimers, based on the total weight of reactants; and
   (b) 35 wt % to 99 wt % of one or more organic acids having one or more hydroxyl groups, based on the total weight of the reactants;
   wherein:
      i. the modified rosin ester has a bio-renewable carbon (BRC) content of 95% to 100%;
      ii. the modified rosin ester has an acid value of 100 mg KOH/g to 400 mg KOH/g.

2. The mixture of rosin esters of claim 1, wherein the organic acid is of natural origin; and/or wherein the one or more rosin acid monomers or dimers are added in the form of a gum rosin, tall oil rosin, wood rosin, derivatives thereof, or combinations thereof; and wherein the organic acid is selected from the group consisting of citric acid, malic acid, lactic acid, tartaric acid, ascorbic acid, and combinations thereof; and/or wherein the mixture of modified rosin ester is neutralized with ammonia or a higher amine.

3. The mixture of rosin esters of claim 1, wherein the mixture of rosin esters comprises at least one rosin ester selected from the group consisting of:
   2- ((7-isopropyl-1,4a-dimethyl-1,2,3,4,4a,4b,5,6,10,10a-decahydrophenanthrene-1-carbonyl) oxy) succinic acid;
   2,2'- ((7,8-diisopropyl-1,4a,10b,14-tetramethyl -1,2,3,4,4a,4b,5,6,7,8,9,10,10a,10b,11,12,13,14,14a,15,15a,15b,16,16a-tetracosahydrodibenzo [fg,ij] pentaphene-1,14-dicarbonyl) bis (oxy)) disuccinic acid;
   2-(3- ((7-isopropyl-1,4a-dimethyl-1,2,3,4,4a,4b,5,6,10,10a-decahydrophenanthrene-1-carbonyl) oxy)-2,5-dioxotetrahydrofuran-3-yl) acetic acid;
   2- (((3-carboxy-2,5-dioxotetrahydrofuran-3-yl) oxy) carbonyl)-2-((7-isopropyl-1,4a -dimethyl-1,2,3,4,4a,4b,5,6,10,10a-decahydrophenanthrene-1-carbonyl)oxy) succinic acid;
   3,3'- ((7,8-diisopropyl-1,4a,10b,14-tetramethyl -1,2,3,4,4a,4b,5,6,7,8,9,10,10a,10b,11,12,13,14,14a,15,15a,15b,16,16a-tetracosahydrodibenzo [fg,ij] pentaphene-1,14-dicarbonyl) bis (oxy)) bis (2,5-dioxotetrahydrofuran-3-carboxylic acid);
   2- ((7-isopropyl-1,4a-dimethyl-1,2,3,4,4a,4b,5,6,10,10a-decahydrophenanthrene-1-carbonyl) oxy) propane-1,2,3-tricarboxylic acid; and
   2- ((7-isopropyl-1,4a-dimethyl-1,2,3,4,4a,4b,5,6,10,10a-decahydrophenanthrene-1-carbonyl) oxy)-2-methyl-succinic acid.

4. A water-based composition comprising the mixture of modified rosin esters of claim 1, and water, wherein the water-based composition is free of styrene; wherein the mixture of modified rosin esters is present in an amount of 5 wt % to 80 wt %, based on the total weight of the composition; and/or wherein the water is present in an amount of 5 wt % to 80 wt %, based on the total weight of the composition.

5. The composition of claim 4, further comprising one or more solvents; wherein the solvents are present in an amount of 0.1 wt % to 50 wt %, based on the total weight of the composition; and/or further comprising lactic acid.

6. The composition of claim 5, wherein at least one solvent is a bio-solvent; and
   wherein the bio-solvents are selected from the group consisting of bio-alcohols, bio-ethers, bio-esters, bio-acids, bio-fatty acid methyl esters, and combinations thereof.

7. The composition of claim 4, further comprising one or more colorants; wherein the colorants are present in an amount of 1 wt % to 70 wt %, based on the total weight of the composition; and wherein the colorants are dyes, organic pigments, or inorganic pigments; and wherein when the colorants are dyes or organic pigments, they are of natural origin, and have a BRC content of 70% to 100%.

8. The composition of claim 4, further comprising one or more additives, selected from the group consisting of modifying resins, adhesion promoters, silicones, light stabilizers, optical brighteners, de-gassing additives, neutralizing agents, flow promoters, defoamers, antioxidants, stabilizers, surfactants, dispersants, plasticizers, rheological additives, waxes, silicones, and combinations thereof; wherein the additives are each independently present in an amount of 0.1 wt % to 10 wt %, based on the total weight of the composition.

9. The composition of claim 8, wherein the neutralizing agent is selected from the group consisting of ammonia, higher amines, and combinations thereof;
   and/or wherein the waxes are selected from the group consisting of amide wax, erucamide wax, polypropylene wax, paraffin wax, polyethylene wax, polytetrafluoroethylene wax, carnuba wax, soybean wax, and combinations thereof; and/or wherein one or more of the modifying resins is a protein; and/or wherein one or more of the additives are natural materials, and have a BRC content of 70% to 100%.

10. The composition of claim 4, wherein the composition has a BRC content of 10% to 100%.

11. The composition of claim 4, wherein the composition is a varnish, pigment grinding vehicle, pigment dispersion, ink or coating vehicle, coating, or finished ink.

12. A printed substrate comprising the composition of claim 4.

13. A method of printing a substrate, comprising the steps of:
   (a) providing a substrate;
   (b) providing the composition of claim 4;
   (c) applying the composition on the substrate; and
   (d) drying or curing the composition on the substrate.

14. A printed substrate, prepared by the method of claim 13.

15. A process for preparing an anionic modified rosin ester, comprising:

reacting:
- (a) 1 wt % to 65 wt % of a rosin, based on the total weight of the reactants; and
- (b) 35 wt % to 99 wt % one or more organic acids having one or more hydroxyl groups, based on the total weight of the reactants;

in a thermal adduction reaction, performed at a temperature of 150° C. to 225° C.;

to obtain an anionic modified rosin ester;

wherein:
- i. the hydroxyl group of the organic acid reacts as an alcohol to increase the acid value of the rosin;
- ii. the modified rosin ester has a bio-renewable carbon (BRC) content of 95 wt % to 100%; and
- iii. the modified rosin ester has an acid value of 100 mg KOH/g to 400 mg KOH/g.

16. The process of claim 15, wherein the ratio of rosin to organic acids is 1:1 molar equivalents based on the hydroxyl groups of the organic acid and the carboxyl groups of the rosin; and/or wherein the thermal adduction reaction is performed under a nitrogen atmosphere; and or wherein the reaction is performed under vacuum.

17. The process of claim 15, wherein the one or more rosin acid monomers or dimers are added in the form of a gum rosin, tall oil rosin, wood rosin, derivatives thereof, or combinations thereof; and/or wherein the organic acid is of natural origin, selected from the group consisting of citric acid, malic acid, lactic acid, tartaric acid, ascorbic acid, and combinations thereof; and/or wherein the modified rosin ester is neutralized with ammonia or a higher amine.

18. A mixture of modified rosin ester esters prepared by the process of claim 15.

19. A water-based composition comprising the mixture of modified rosin esters of claim 18.

20. The water-based composition of claim 19, wherein the composition is styrene free.

21. A substrate comprising the composition of claim 19.

* * * * *